United States Patent Office 3,806,435
Patented Apr. 23, 1974

3,806,435
METHOD FOR TREATING WASTE LIQUOR
Masanori Ohta, 55 Takehana-Nishinokuchi-cho, Yamashina, Higashyama-ku, Kyoto-shi, Kyoto-fu, Japan
No Drawing. Filed Mar. 8, 1973, Ser. No. 339,133
Claims priority, application Japan, Mar. 9, 1972,
47/23,557
Int. Cl. C02c 5/12
U.S. Cl. 204—149    3 Claims

ABSTRACT OF THE DISCLOSURE

A method for treating waste liquor which comprises subjecting a waste liquor containing one or more sulfidic contaminants selected from hydrogen sulfide, alkaline sulfides and inorganic and organic hydrosulfides to an electrolytic treatment using an anode of iron/aluminum or zinc/aluminum and a cathode of iron or zinc, thereby eliminating the sulfidic contaminants from the waste liquor.

FIELD OF THE INVENTION

This invention relates to a method for treating waste liquor containing sulfidic contaminants. More particularly, this invention relates to a method for eliminating one or more sulfidic contaminants from waste liquor by electrolytic treatment.

BACKGROUND OF THE INVENTION

Waste liquor discharged from plants in the field of petroleum refining, pulping and food processing industries contains hydrogen sulfide and other sulfides. Such sulfidic contaminants cause offensive odor in rivers and corrosion of steel structures. Accordingly, elimination of the sulfidic contaminants has been a great problem in the prevention of environmental pollution. A method known hitherto for eliminating hydrogen sulfide from waste liquor comprises blowing air thereinto. However, this method has such demerits that acidification and oxidation with an oxidizing agent are needed as preliminary treatment and that it is difficult to eliminate hydrogen sulfide so entirely from waste liquor as to permit perfect destruction of its foul odor. As waste liquor discharged from plants especially in the field of petrochemical and paper-making industries contains a considerable amount of various sulfidic contaminants in addition to hydrogen sulfide, there is a large demand for an effective method for eliminating these sulfidic contaminants from waste liquor.

BRIEF SUMMARY OF THE INVENTION

Accordingly, it is an object of this invention to provide a method for effectively treating waste liquor containing sulfidic contaminants by means of an electrolytic treatment.

It is another object of this invention to provide an electrolytic method for converting sulfidic contaminants in waste liquor into iron sulfide.

Other and further objects, features and advantages of the invention will be more apparent from the following description.

DETAILED DESCRIPTION OF THE INVENTION

It has now been found that sulfidic contaminants in waste liquor can be eliminated effectively by subjecting the waste liquor to an electrolytic treatment using a special combination of electrodes.

In accordance with this invention, there is provided a method for effectively treating waste liquor containing one or more sulfidic contaminants selected from hydrogen sulfide, alkaline sulfides and inorganic and organic hydrosulfides to an electrolytic treatment using a composite anode of iron/aluminum or zinc/aluminum and a cathode of iron or zinc, thereby eliminating such sulfidic contaminants from the waste liquor.

In the electrolytic treatment, one or more sulfidic contaminants in waste liquor are reacted with iron or zinc in the composite anode to form iron or zinc sulfide which is precipitated together with $Al(OH)_3$ and $AlO(OH)$ formed by simultaneous decomposition of aluminum in the composite anode and removed from the liquor by a simple separation technique such as filtration.

The electrolytic method of this invention is characterized by using a combination of iron or zinc and aluminum as a composite anode. The use of an iron or zinc anode will be sufficient if the object is only the removal of hydrogen sulfide and other sulfidic contaminants, such as iron sulfide or zinc sulfide. However, the use of aluminum jointly with iron or zinc as the composite anode is required for rapidly precipitating the resultant iron or zinc sulfide.

The two anode bodies may be employed in the state of intimate contact with each other or by electrical connection by means of a suitable lead wire. As a material for the other electrode, i.e., the cathode, iron or zinc alone is employed. Iron or zinc utilizable as electrode material for this invention may be any one of the materials conventionally used in ordinary electrolytic operations, while the aluminum electrode may be made of aluminum itself or an aluminum alloy.

Electric current from any type of DC power supply sources including battery cells may be used for the electrolytic treatment of this invention. The conditions for the electrolysis are not determined definitely as they depend on the chemical composition and quantity of waste liquor to be treated. In general, however, a voltage of 2–50V and a current of 10 mA—100 A are usually applied to the electrolytic treatment. The treatment time will generally be shortened as the intensity of the electric current becomes greater. The electrolytic treatment is carried out regardless of whether the waste liquor is acidic or alkaline. Considering economy on power consumption and the wear of the electrodes, however, it is advantageous to control the nature of waste liquor to neutral as far as possible. Care should, of course, be taken to avoid making the liquor excessively acidic or alkaline. If the liquor is made excessively acidic, iron or zinc sulfide, as well as aluminum hydroxide, will not be precipitated under such conditions or precipitates of the resulting iron or zinc sulfide and aluminum hydroxide once formed will quickly be dissolved in the acidic liquor. On the other hand, if the liquor is made excessively alkaline, aluminum hydroxide will not be precipitated under such alkaline condition or a precipitate of once formed aluminum hydroxide will be dissolved as aluminate in the alkaline liquor.

In the method of this invention, it is advantageous to move continuously the liquor in contact with the surface of the electrodes, whereby the electrolytic product deposited on the surface of the electrodes is removed continuously. Such movement of the liquor can be attained by air-blowing or agitation.

According to the method of this invention, not only hydrogen sulfide present in waste liquor but also various sulfidic contaminants dissolved therein can easily be eliminated. Such soluble sulfidic contaminants include alkaline sulfides, such as sodium sulfide, potassium sulfide, ammonium sulfide and calcium sulfide; inorganic hydrosulfides, such as sodium hydrosulfide, potassium hydrosulfide and ammonium hydrosulfides; and organic hydrosulfides, such as alkyl mercaptans or aromatic mercaptans. As the peculiar, offensive odor inherent to such sulfidic contaminants can thus be eliminated almost completely according to the method of this invention, the waste liquor subjected to the electrolytic treatment can be freely discharged into the rivers without causing any environmental pollution.

A flocculent precipitate containing iron sulfide or zinc sulfide formed by the electrolytic treatment of this invention can be separated easily by an adequate separating means such as settling, filtration and centrifugal separation.

PREFERRED EMBODIMENTS OF THE INVENTION

This invention will be illustrated in more detail by way of examples. It is to be noted, however, that these examples are given only for illustration and not for limiting the scope of this invention.

Example 1

In a glass vessel provided at the bottom with an air-blowing pipe are placed 500 cc. of waste liquor (hydrogen sulfide content: 40 p.p.m.) emitting offensive odor discharged from petroleum refining steps. An electrolytic treatment of the waste liquor is then carried out for 5 minutes, sending a DC current of 7 v./50 ma. and using a composite anode made of an iron plate (30 x 100 mm.) and an aluminum plate (30 x 100 mm.) connected with each other by a steel wire and a cathode made of an iron plate (60 x 100 mm.), with these electrodes kept standing in parallel in the waste liquor at a distance of 40 mm. The resulting dark gray flocculent precipitate is removed by filtration whereby a colorless, clear, odorless liquid is obtained. No hydrogen sulfide is detected in the liquid thus treated.

Example 2

In a manner similar to that described in Example 1, 500 cc. of waste liquor (ethyl mercaptan content: 100 p.p.m.; pH 6.5) discharged from a chemical-preparing plant is electrolytically treated for 10 minutes by sending DC current of 10 v./1 a. No mercapto radical is detected in the resulting colorless, clear odorless liquor.

What is claimed is:

1. A method for treating waste liquor, which comprises subjecting a waste liquor containing one or more of sulfidic contaminants selected from hydrogen sulfide, alkaline sulfides and inorganic and oragnic hydrosulfides to an electrolytic treatment using a composite anode of iron and aluminum or zinc and aluminum and a cathode of iron or zinc, thereby eliminating said sulfidic contaminants from the waste liquor.

2. A method according to claim 1 wherein a waste liquor containing hydrogen sulfide is treated.

3. A method according to claim 1 wherein a composite electrode made of iron and aluminum is used as said anode.

References Cited

UNITED STATES PATENTS

| | | | |
|---|---|---|---|
| 799,862 | 9/1905 | Meaker | 204—149 X |
| 966,025 | 8/1910 | Lautzehiser et al. | 204—149 |
| 3,347,786 | 10/1967 | Baer et al. | 204—149 X |

JOHN H. MACK, Primary Examiner

A. C. PRESCOTT, Assistant Examiner

U.S. Cl. X.R.

204—152